TAPE RECORDING AND TRANSLATION, AND THE LIKE

Original Filed May 4, 1954

2 Sheets-Sheet 1

Inventors:
Thos. A. Banning, Jr., & Agnes J. Ranseen, Executrix of Estate of Emil L. Ranseen, dec'd.
by Thos. A. Banning, Atty

TAPE RECORDING AND TRANSLATION, AND THE LIKE

Original Filed May 4, 1954

Inventors:
Thos. A. Banning, Jr. &
Agnes J. Ranseen,
Executrix of Estate of
Emil L. Ranseen, dec'd.,
by Thos. A. Banning Jr.
Att'y United States Patent Office 3,221,336
Patented Nov. 30, 1965

3,221,336
TAPE RECORDING AND TRANSLATION, AND THE LIKE

Thomas A. Banning, Jr., Chicago, Ill., and Emil L. Ranseen, deceased, late of Chicago, Ill., by Agnes J. Ranseen, executrix, Evanston, Ill.; said Agnes J. Ranseen assignor to said Banning Original application May 4, 1954, Ser. No. 427,428, now Patent No. 2,976,354, dated Mar. 21, 1961. Divided and this application Mar. 9, 1961, Ser. No. 94,652
5 Claims. (Cl. 346—74)

This invention relates to improvements in tape recording and translation, and the like. Broadly stated, these improvements relate to improvements in cross-scanning tape recording and translation; and specifically, they relate to cross-scanning tape recording and translation with use of magnetic type tape. This application is a division of the parent application of Thomas A. Banning, Jr., and Emil L. Ranseen, now deceased, for Improvements in Tape Recording and Translating, and the Like, Serial No. 427,428, filed May 4, 1954, and issued as Letters Patent of the United States, No. 2,976,354, March 21, 1961. In that parent application and patent there is disclosed means to produce and to interpret signals in cross-scanning arrangement on the magnetizable tape, wherein the cross-scans are produced by use of an electronic unit which includes a deflectable beam and means to produce the deflections of such beam under control, with impingement of the beam against an elongated target, and either with or without modulation of the beam during such cross-scans. That parent case also discloses means to produce at the exterior of the envelope of the electronic unit, a force which traverses the width of tape which carries the cross-scans, following the deflections of the beam within the envelope; and also discloses means such that the strength of the force thus produced exterior to the envelope, and which follows the beam scans, is always proportional to the strength of the beam within the envelope. During recording operations the beam strength is modulated, if necessary, according to the strengths of signals to be recorded; during translation from the tape of previously recorded signals, and according to certain disclosures of that parent application and patent, the beam strength within the envelope is retained constant, and provision is made for producing a translation signal proportional to the combined strengths of the recorded signals and the strength of the beam within the envelope.

That earlier application and patent also discloses means to produce the force which is exterior to the envelope, by provision of a series of electrical conductors, extending through the envelope from locations along the target, to locations exterior to the envelope, and in proximity to the tape surface and in alignment proper to produce or to sense the signals to be recorded on the tape, or to be sensed and translated from the tape during a play-back operation. This arrangement is such that as the beam deflections occur under control, and either with or without modulation of the beam strength, the beam impinges successively with the conductor portions which are within the envelope, thus electrifying them proportionately to the strength of the beam at such impingement location. Thus, electrifying actions are also produced to the conductor portions outside of the envelope, for conduct of either the recording or the sensing and translating operations.

The present application relates to improved means to translate the electrifying signals produced on and through the conductors which extend through the envelope of the electron unit, into improved magnetizing effects produced on the tape during a recording operation; or to improved sensing effects produced by the previously recorded magnetic signals carried by the tape, and which when sensed are properly amplified and translated as desired. In the former case—that of translating the electrifying signals produced on and through the conductors, for improved magnetizing effects on the tape—there is provided a minute magnetizing coil carried close to the tape surface, or in contact therewith during tape travel, corresponding to each of the conductors which extend through the envelope, together with suitable circuitry for providing a circuit through each such minute coil, during the short instant that the deflectable beam is in contact with the end of the conductor within the envelope. The magnitude of the current which will then flow through each such coil during deflection of the beam, will depend on the beam strength at the instant of beam impingement on each such conductor. Thus, there will be produced on the tape, during each beam scan, a series of magnetized elemental areas, lying successively along the line of scan of the tape, and successively of strengths proportional to the beam strengths at the instants of production of such elemental areas. Accordingly, such arrangement provides means to amplify the magnetized elemental area strengths proportionately to the increased magnetizing effect produced by such coils, as compared with the magnetizing effect produced by other arrangements.

It is also an object of the invention to amplify the strength of the beam which impinges against the end of each conductor within the envelope, by amplifying means, such as dynode means, as hereinafter disclosed.

In the case of producing improved sensing effects from previously recorded magnetic signals, namely, that of translating the previously recorded variations of magnetism carried by the tape on scans extending across such tape—there is provided, corresponding to each of the conductors which extend through the envelope, a minute conductor extending in close proximity to or even in contact with, the tape surface in direction such that the travel of the tape will induce, by the magnetic strength previously recorded at the location of such minute conductor across the tape width, an E.M.F. proportionate to the strength of such magnetism. Proper circuitry is also provided for transferring, and amplifying, the signal thus induced corresponding to such elemental tape scan area.

If desired, means may be provided for amplifying the effects produced by such sensing arrangement; such amplifying arrangement, being for example, by use of dynode means in position to amplify the sensed effect, or to produce a base of potential above which the sensed E.M.F. is raised.

A further feature and object of the invention relates to the provision of means to mount the minute magnetizing coils or the minute sensing conductors, such that these small elements may be retained against deformation, and may be firmly secured to the electronic unit and held in place without deformations which might otherwise be produced, due to their minute size and small physical strengths. This feature also includes convenient means to manufacture such elements into sets for ready attachment to the electronic units with which they are to be used.

Other objects and uses of the invention will appear from a detailed description of the same, which consists in the features of construction and combinations of parts hereinafter described and claimed.

In the drawings:

FIGURE 1 shows a section of tape whereon a recording is made magnetically, with use of the cross-scan arrangement, but with the use of the conductor arrangement for transferring the controls from the electron beam inside of the envelope to suitable magnetizing elements outside of the envelope; and this figure shows the tape carrying the magnetizable material with provision for first subjecting such magnetizable material to a pre-magnetized effect to ensure provision of a uniform amount of magnetic effect on the tape surface, together with the scanning tube arrangement and the magnetizing devices for thereafter producing on the so-prepared tape surface the desired modulations of magnetization;

Figures 1, 2, 3, 4, 5, 6, 7:
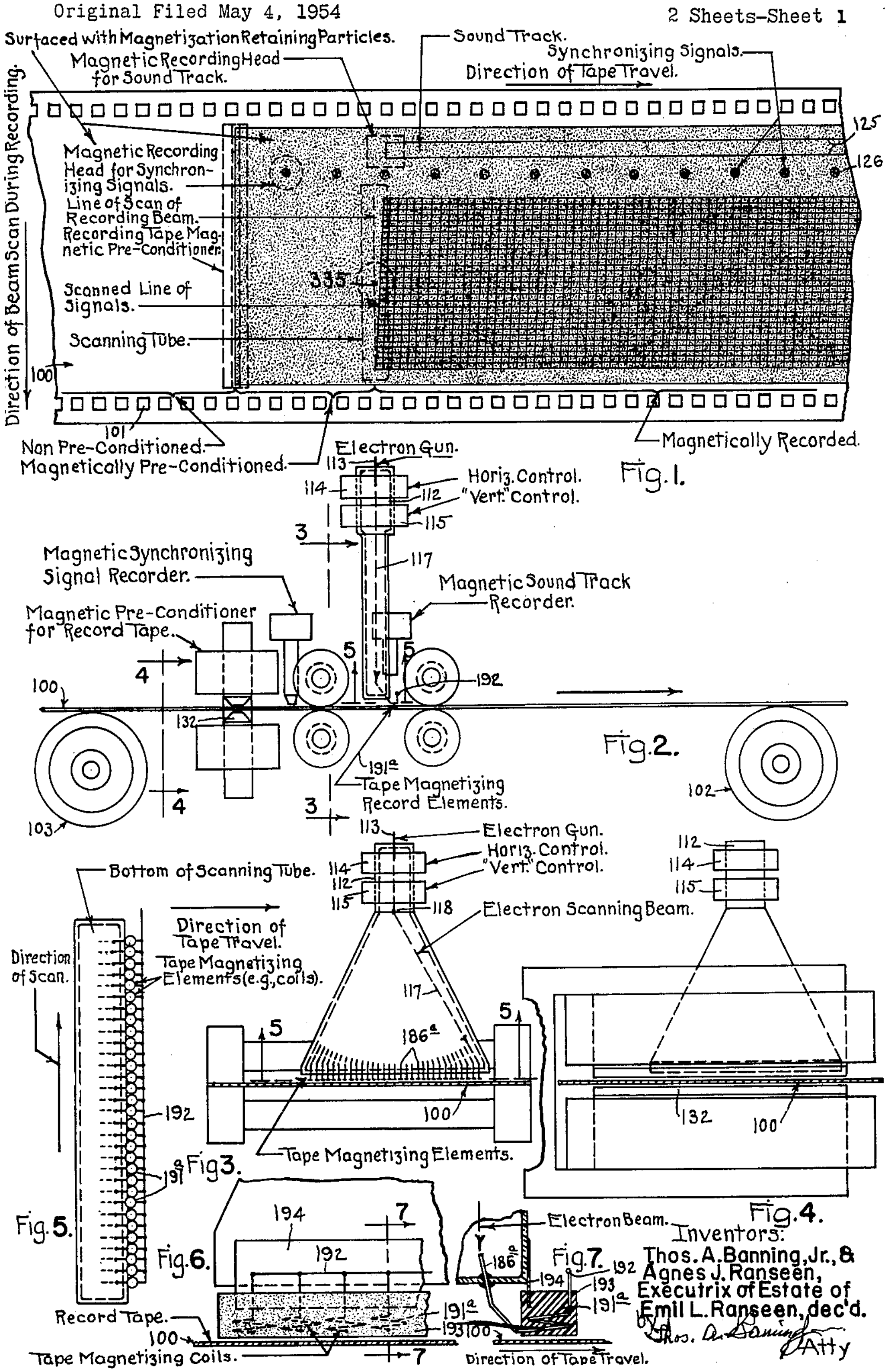
FIGURE 2 shows an edge view corresponding to FIGURE 1; and this figure shows in outline the presence of the magnetizing coils (of very small size) outside of the tube envelope, each coil being connected to one of the conductors which extend through the envelope and whose inner ends are subject to impingement by the electron beam during its scanning swings.
FIGURE 3 shows a cross-section taken on the line 3—3 of FIGURE 2, looking in the direction of the arrows; and this figure shows the lower ends of the conductors which extend through the lower portion of the scanning tube as being individually in connection with the minute magnetizing coils which are located close to the tape surface.
Figure 8:
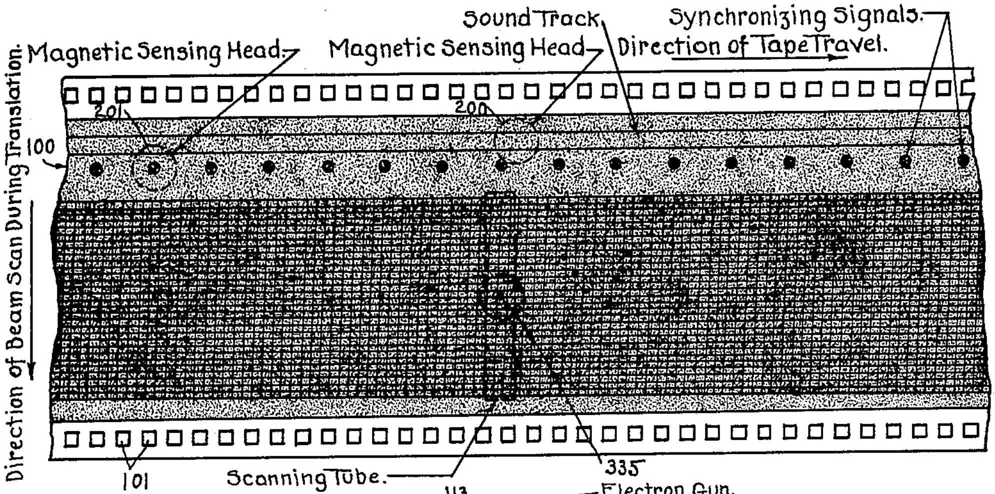
Figures 9, 10, 11, 12, 13, 14:
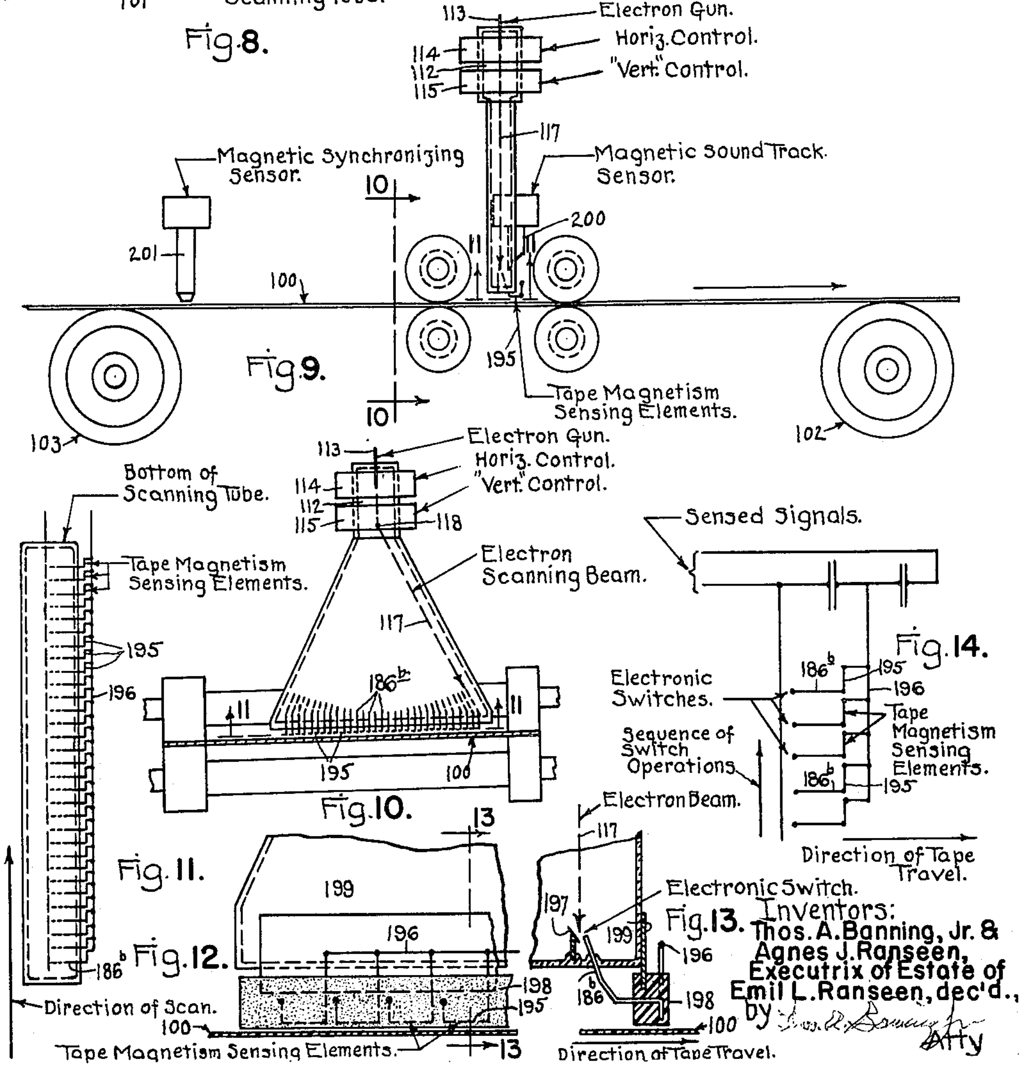

FIGURE 4 shows a cross-section taken on the line 4—4 of FIGURE 2, looking in the direction of the arrows; and this figure shows the pre-magnetizing unit for placing a magnetization on the tape of uniform intensity over the entire tape surface prior to the subjecting of any elemental area of the tape surface to the magnetization modulating effect of the scanning tube coil in alignment with such elemental area;

FIGURE 5 shows a bottom end view of the scanning tube, together with the minute magnetizing coils which are connected to the ends of the conductors extending through the tube envelope, the free ends of all such minute coils being connected to a common return line as shown in this figure;

FIGURE 6 shows on greatly enlarged scale one end portion of the lower portion of the scanning tube, together with the magnetizing coil unit portion adjacent to such tube end, such magnetizing coil unit comprising a block of synthetic material having the coils embedded and moulded in such block, with their ends properly connected to the common return line, and to the individual conductors which extend through the tube end;

FIGURE 7 shows a cross-section taken on the line 7—7 of FIGURE 6, looking in the direction of the arrows;

FIGURE 8 shows a section of the magnetizable material tape carrying the magnetic cross-scan signal variations, and also carrying a magnetically produced sound track, and the magnetically produced synchronizing signals along one edge portion of the tube;

FIGURE 9 shows an edge view corresponding to FIGURE 8; and this figure shows the minute sensing conductors which are located in regular spacing across the width of the scanned and recorded area, and which are electromagnetically influenced by the travelling tape to produce the desired sensing effects, which effects are then amplified and translated as desired;

FIGURE 10 shows a cross-section taken on the line 10—10 of FIGURE 9, looking in the direction of the arrows; and this figure shows the sensing conductors previously referred to and which are carried by a sensing block at the lower end of the scanning tube;

FIGURE 11 shows a bottom face view of the scanning tube of FIGURES 9 and 10; and this figure shows the minute sensing conductors located in alignment across the width of the cross-scan recorded portion of the tape; and one end of each such sensing conductor is connected to one of the conductor wires extending through the tube envelope and the free ends of these scanning conductors are all connected to a common line which may be used for delivering the sensed effects of the unit to suitable amplifying and translating units as desired;

FIGURE 12 shows on greatly enlarged scale one end portion of the lower portion of the scanning tube; and it shows the block of synthetic material in which the minute sensing conductors may be embedded or moulded in suitable manner;

FIGURE 13 shows a cross-section taken on the line 13—13 of FIGURE 12, looking in the direction of the arrows; and FIGURE 14 shows, schematically, a simple form of wiring connections for delivering the sensed effects from the minute sensing conductors to a common amplifying and interpreting unit or units.

In both of the units shown in FIGURES 1 to 7, inclusive, and FIGURES 8 to 14, inclusive there is shown a deflectable beam electronic unit supported vertically in position above the magnetic surfaced material tape; and such tape is mounted for endwise movement under suitable drive, according to conventional magnetic tape recording practice. Examination of each of FIGURES 1, 3, 4, 8, and 10 shows that such tape is of width sufficient to accommodate cross-scans produced by one of the illustrated units (that of FIGURES 1 to 7, inclusive), and sensed by the other such unit (that of FIGURES 8 to 14, inclusive). The details of such cross-scanning are fully disclosed in said patent application, issued patent, No. 2,976,354; accordingly, it is not deemed necessary to include further details of such operations here, except as the disclosures of the present case relate to certain details of construction and operation of certain of the embodiments of that parent case.

It is also noted that each of the showings of the figures herein included, includes an electronic unit which is supported vertically with respect to the horizontally travelling tape, so that the closed end of such unit's envelope is brought close to the tape surface, being that envelope end at which the target of the deflectable beam is located. The present embodiments are not, however, limited to use in connection with such vertically mounted electronic unit, except as limitations may be imposed by the claims to follow. These vertical showings, however, are of simple construction since the deflectable beam does not require change of its longitudinal direction, beyond the conventional lateral deflections produced by conventional deflection yokes or other elements needed to produce such deflections.

Referring first to each of FIGURES 3 and 10 it is seen that the lower or scanning end of each of the electronic beam units is of width sufficient to accommodate the desired scan across the width of the tape to carry the cross-scanned signal recordings; and thus each of such units' envelopes is of generally triangular form, with its broad end proximate to the tape surface.

The upper or neck portion of each such unit, 112, carries a horizontal or lateral deflection yoke 114; and is also shown with a conventional "vertical" deflection yoke, 115; but for the purposes of the present case such vertical deflection yoke need not be used. The lateral deflection yoke serves to produce controlled lateral swings of amplitude needed to produce or scan the cross-scans of desired width across the tape. The controls for producing such lateral scans need not be detailed here, beyond stating that such a control as a conventional sawtooth generator may be used for producing such lateral swings, at such rate as needed for the intended operations. In the case of recording picture signals for television programs such lateral swings will, according to present F.C.C. regulations, be at the rate of 15,750 scans/sec.

Extended through the broad end of the envelope there is provided a series of electrical conductors whose upper ends (within the envelope), 186$^a$ in FIGURE 3, and 186$^b$ in FIGURE 10, extend at uniformly spaced positions along the target area which is scanned by the electron beam. It is here noted that such inner envelope-upper conductor ends are of varying lengths so that their tips, which are impacted by the electron beam during each scan lie substantially in a circular arc drawn about the center of beam deflection. Accordingly, it is not necessary to change the focal length of the beam during scan, in order to ensure that each of the conductors will be impacted by the focus of the beam, and thus with maximum electrical effect on the conductor.

As the beam comes successively into engagement with each of the conductors of the series, an electrical discharge effect is produced on such conductor; so that if such conductor be connected to a unit which is in turn supplied by current of proper potential and polarity, a current flow will occur from such conductor to the electron beam and thus to the gun end of the electronic unit. It is noted that in each of figures such gun is shown at 113, and so legended.

The showings of FIGURES 1 to 7 disclose a convenient embodiment of the present inventive features in a unit for producing recordings on the tape; and the showings of FIGURES 8 to 14 disclose a convenient embodiment of such inventive features in a unit for sensing recordings already cross-scanned on the tape. It is here noted, however, that the embodiment of FIGURES 1 to 7 may also be used for sensing previously recorded signals and that the embodiment shown in FIGURES 8 to 14 may also be used for producing recordings; but as will presently appear, such two embodiments are primarily intended for production of the functions stated at the beginning of this paragraph.

In the embodiment of FIGURES 1 to 7, inclusive, there is provided a series of minute coils 191$^a$ corresponding to the ends of the conductors 186 outside of the envelope, such minute coils being supported in regular succession close to or even in light contact with the surface of the tape, and along the line of scan to be produced. In this connection it is noted that, although such minute coils are shown in FIGURE 5 as extending along a line parallel to the lower end portion of the envelope, and thus at right-angles to the center line of the tape (see FIGURE 1 wherein such lower envelope portion is shown at right-angles to the tape center line), still, due to the endwise travel of the tape during recording, each scan produced on the tape actually extends across such tape at a slight angle, as shown in FIGURE 1. One end of each such coil is connected to the outer envelope end of the corresponding conductor. Also, such coils are thus supported with their axes extending normal to the tape surface so that the magnetizing effect produced by each coil during current flow through its helix (produced by the engagement of the electron beam with the inner end of its conductor) will act directly on the magnetizable material of the tape, and thus produce a recording of strength proportionate to the strength of the electron beam at the instant of engagement with such coil's conductor. Thus, during successive beam scans there will be produced successive cross-scans of magnetized elemental areas, each such area being magnetized proportionately to the strength of the electron beam at the instant of engagement with the conductor of the corresponding coil.

The free ends of all such coils (outside of the envelope) are connected to the line 192 (see FIGURES 6 and 7), which, in turn is connected to the proper portion of the circuitry for current supply to the coils.

In order to support these minute coils firmly, and to retain them in good helical form and in desired position close to the tape surface, they may be embedded in a block of such material as synthetic moldable plastic, such as the block 193, FIGURES 6 and 7, and such block may in turn be secured by the flange plate 194 to the face of the lower portion of the envelope of the electronic unit.

Referring next to the embodiment shown in FIGURES 8 to 14, inclusive, this embodiment is intended primarily for sensing the previously recorded signals, for amplification and translation according to conventional or other operations. In this case the conductors extend from the interior of the envelope downward through such envelope, and have their lower outside end portions carried down close to the tape surface, and then formed into direction transverse of the tape width, to provide sensing elements extending to right-angles to the direction of tape travel, and thus in position to cut the lines of force from the magnetically produced elemental areas of the tape. Such right-angularly extending (transverse) portions are indicated at 195 in FIGURES 11 and 12. Then such sensing elements are extended upwardly far enough for connection to the common line 196 (see FIGURES 11, 12, 13 and 14). Such line may then be connected to the proper elements of circuitry for translation of the sensed signals.

With this arrangement, the contact of the electron beam with the inner end portions of such conductors in succession during lateral scan of the beam, will complete circuits of the successive conductors. As each of the conductors is thus brought into the sensing circuitry, the E.M.F. produced in the element 195 of such conductor is effective to influence the sensing circuitry, for translation of such E.M.F. into the translating circuitry. The endwise travel of the tape during the short interval of engagement of the electron beam with the inner end of such conductor, will develop such E.M.F. in such portion 195 of such conductor element.

Provision is made for amplifying the effects produced by such successive sensings of the magnetic elemental areas of the tape. To this end a dynode or series of dynodes 197 (see FIGURE 13) is provided adjacent to the inner ends of the conductors 186$^b$, spaced apart from such inner ends, but so placed that the electron beam during scan will impinge each of such dynode elements in turn (or will engage a single long dynode successively at points opposite to each of such conductors), thus producing a secondary emittion towards such conductor with corresponding amplification of the potential to which the conductor is subjected. With this arrangement there is also produced an electronic switching operation from the electron beam to each of the conductors in succession, and with amplification during each such switching operation.

Examination of FIGURES 3 and 10 will show that the inner end portions of the conductors are not only brought into a circular arc formed about the center of beam deflection, but that such inner end portions are also brought closer together than the actual spacing between the successive conductors at the points where they extend through the lower end of the envelope. Accordingly, there will be produced a somewhat continual sweep from each conductor to its successor in the beam scan with slight overlaps of continuity from elemental area to elemental area scanned. The extent of such possible overlap will of course depend not only on the closeness of the successive inner ends to each of other, but also on the fineness of the focal point of the beam. Such fineness will be much enhanced by the circular arc arrangement of such inner end portions, since by this arrangement a better effect will be possible in the production of continuous focal length engagement of the beam with the successive conductor inner ends.

In the embodiment of FIGURES 8 to 14, inclusive there is shown the embedding of the sensing elements 195 into a block of such material as moldable synthetic, but with the actual sensing portions 195 close to or even in actual contact with the tape surface during sensing; in which latter case (actual contact with the tape surface) such sensing portions 195 should be included at the actual bottom face of such block.

In FIGURES 1, 2 and 4 there is shown a magnetic preconditioner unit including the pole pieces 132 by which if desired, a uniform degree of magnetization may be applied to the tape prior to producing the modulated magnetizations thereon by the electronic recording unit. By this means it is possible to bring the entire surface of the magnetic tape to a degree of magnetization such that the recordings will be produced at a location above the zero magnetization point of the hysteresis curve of the magnetic material used; but also at a point below the knee of such magnetizing curve.

When the sensing of previously recorded signals is being conducted, the electron beam strength should be steady, and not modulated, except for special purposes; so that the effects produced by the sensing of the successive elemental areas will be directly proportional to the strengths of the magnetism sensed at such elemental areas.

The use of the term "minute" in defining the sizes of the magnetizing coils 191ᵃ indicates a smallness proportional to the desired definition of the signals being sensed. Thus, if the operation may be one in which, say, 31 elemental areas are to be recorded and afterwards sensed during each cross-scanning operation (as shown in FIGURE 5, for example), and with a cross-scanning width of, say 2 inches, the successive coils may be located at center to center distances of $1/15$ inch. Much smaller coils may, however, be used, or larger ones if desired. It is also possible to stagger the successive coils along the lineal scan, thus bringing their center to center points closer together than would otherwise be possible.

What is claimed is:

1. A signal recording unit for producing magnetic signal recordings on a magnetizable tape, comprising a deflectable beam electronic unit, including an envelope, an elongated target within said envelope, an electron gun within the envelope in position to emit an electron beam, means to produce lateral deflections of the electron beam with the deflections lying in a plane parallel to the target, a series of electric conductors extending through the envelope at successive locations along the target and having their inner ends lying within a plane parallel to the plane of beam deflection and laterally displaced from said beam deflection plane, a dynode unit within the envelope and having its secondary emittion surface lying at an angle to the plane of beam deflection and intersecting said beam deflection plane along a line substantially parallel to the inner ends of the conductors and constituted to emit secondary emittion against said conductor inner ends in succession during beam deflections, means to support the deflectable beam electronic unit with the conductor elements exterior to the envelope in proximity to the tape surface, together with means in connection with the outer ends of said conductors constituted to transfer magnetic force signals between the conductors and the tape surface.

2. A signal recording unit as defined in claim 1, wherein the means which are in connection with the outer ends of the conductors constitute magnet elements responsive to currents flowing through the conductors during secondary emittion from the dynode unit under electron beam impact against the dynode unit.

3. A signal recording unit as defined in claim 2, wherein the magnet elements are embedded into a block of nonmagnetic material which is non-conducting.

4. A signal transferring unit as defined in claim 2, wherein each magnet unit includes a current flow portion extending in direction non-parallel to the length of the tape, together with means to produce travel of the tape in the direction of its length.

5. A signal transferring unit as defined in claim 2, wherein the magnet elements comprise conductor coils with their convolutions substantially parallel to the tape surface.

References Cited by the Examiner

UNITED STATES PATENTS

| | | | |
|---|---|---|---|
| 2,565,515 | 8/1951 | Pallnel | 313—105 |
| 2,657,377 | 10/1953 | Gray | 178—6.6 |
| 2,947,809 | 8/1960 | Karolus | 178—6.6 |

IRVING L. SRAGOW, *Primary Examiner.*

ELI J. SAX, *Examiner.*